United States Patent [19]

Jenkins et al.

[11] Patent Number: 5,365,310
[45] Date of Patent: Nov. 15, 1994

[54] REMOTE DIAGNOSIS OF COPY QUALITY DEFECTS

[75] Inventors: Everett W. Jenkins, Webster; Donald L. Wegeng, Rochester; Martin F. Lo Biondo, Penfield; John M. Rubens, Pittsford, all of N.Y.

[73] Assignee: Xerox Corporation, Stamford, Conn.

[21] Appl. No.: 99,385

[22] Filed: Jul. 30, 1993

[51] Int. Cl.$^5$ .............................................. G03G 21/00
[52] U.S. Cl. ................... 355/202; 355/200; 355/204; 355/208
[58] Field of Search ............... 355/200, 202, 203, 204, 355/205, 206, 207, 208, 209; 364/138, 550; 371/15.1, 67.1

[56] References Cited

U.S. PATENT DOCUMENTS

4,583,834  4/1986  Seko et al. ........................ 355/206
5,038,319  8/1991  Carter et al. .
5,057,866  10/1991 Hill, Jr. et al. .
5,077,582  12/1991 Kravette et al. .................. 355/206
5,214,772  5/1993  Weinberger et al. ........... 355/202 X
5,257,069  10/1993 Hirata et al. ..................... 355/200

Primary Examiner—A. T. Grimley
Assistant Examiner—Sandra L. Brasé
Attorney, Agent, or Firm—Oliff & Berridge

[57] ABSTRACT

A method for remotely diagnosing copy quality defects. The image scanner on a system reprographics machine, or other digital copier, is used to scan a document that has a copy quality defect. Information about the problem, which may include the scanned image itself as well as machine related parameters resident in non-volatile memory, is then transmitted to a host computer that can diagnose the problem. The diagnosis and instructions for correcting the defect are thereupon given either to a service representative or transmitted back to the user, who can then correct the problem. In some instances, the problem can be fixed remotely by adjusting non-volatile memory values using the Remote Interactive Communications (RIC) network or other similar communications network between the host computer and the defective system reprographic machine.

16 Claims, 6 Drawing Sheets

REMOTE DIAGNOSIS OF COPY QUALITY DEFECTS

BACKGROUND OF THE INVENTION

1. Field of the Invention

This invention relates to a method for remotely diagnosing copy quality defects in system reprographic machines or other digital copiers.

2. Description of Related Art

In system reprographic machines, or digital copiers in general, a document or series of documents comprising at least one print job are successively scanned. Upon scanning of the documents, image signals are obtained and electronically stored. The signals are then read out successively and transferred to a printer for formation of the images on paper. Once a document is scanned, it can be printed any number of times or processed in any number of ways (e.g., words deleted or added, image magnified or reduced). If a plurality of documents comprise a job that is scanned, the processing or manipulation of the scanned documents can include deletion of one or more documents, reordering of the documents into a desired order, or the addition of a previously or subsequently scanned document. The printing or processing can be relatively synchronous with scanning or asynchronous after scanning.

If asynchronous, a time interval exists between scanning and printing or processing. The system can then accumulate a number of scanned jobs in the system memory for subsequent processing or printing. The order of the jobs to be printed may be different from the order of the jobs as scanned depending on the priority of the jobs and the desires of the operator for increasing productivity or throughput and decreasing printer or scanner down time.

However, even system reprographic machines need occasional alignment or correction of copier components. Further, mechanical problems in paper handling (i.e., skew, delayed feed and the like) as well as incorrect placement of transparencies can also adversely affect copy quality. Copy quality variation both within a reproduction machine and within a machine population is a major concern. Known methods of correction or calibration require extensive operator interaction or they provide inadequate correction.

Over time and through extended use, the subsystems of a system reprographic machine gradually wear, become contaminated, or slip out of adjustment. Because so many of the subsystems, for example, the printer and illumination subsystems are interrelated and dependent upon each other, errors or degradation of any of these components affects the operation and quality of the other components, usually propagating the errors. Due to this interrelationship, it is often difficult to determine the root cause of a copy quality error or to isolate one subsystem's error from errors affecting other components.

Typically, most copy quality problems can only be resolved by a trained service representative. The service representative is called and must invariably travel to the customer's location, inspect the defect(s) in copy quality and then make adjustments to the customer's machine. For more difficult problems, the service representative may have to consult with other experts to finally diagnose the problem.

There are several disadvantages to the typical telephonic service call initiated by the operator at the machine location. First, it is unlikely that the service representative will know the cause of the problem before arriving at the customer's location, which means that it is possible that the service representative will not have the proper parts to correct the problem. Second, the amount of training and experience necessary to make a correct diagnosis on the first attempt, is considerable (and expensive). Finally, difficult problems may require considerable time to diagnose and repair, particularly if engineering must be consulted, which contributes to customer dissatisfaction.

Recently, however, systems for monitoring the operation of a plurality of reprographic machines from a remote source by use of a powerful host computer having advanced, high level diagnostic capabilities have been developed. These systems have the capability to interact remotely with the machines being monitored to receive automatically initiated or user initiated requests for diagnosis and to interact with the requesting machine to receive stored data to enable higher level diagnostic analysis. Such systems are disclosed in U.S. Pat. No. 5,038,319 and 5,057,866 (the disclosures of which are incorporated herein by reference), owned by the assignee of the present invention. These systems employ Remote Interactive Communications (RIC) to enable transfer of selected machine operating data (referred to as machine physical data) to the remote site at which the host computer is located, through a suitable communication channel. The machine physical data may be transmitted from a monitored document system to the remote site automatically at predetermined times and/or in response to a specific request from the host computer. Machine physical data may also be transmitted upon operator instruction or when a problem severity threshold is reached.

In a typical RIC system, the host computer is linked by a public switched telephone system or a combination of public and dedicated systems to local reprographic machines via modems. The host computer may include a compiler to allow communication with a plurality of different types of machines and an expert diagnostic system that performs higher level analysis of the machines physical data than is available from the diagnostic system in the machine. After analysis, the expert system can provide an instruction method which can be used by the machine operator at the site of the document system to overcome a fault. Alternatively, if the expert system determines that more serious repair is necessary or a preventive repair is desirable, a message is sent to a local field work office giving the identity of the machine and an identification of the type of service action required.

Importantly, however, such expert systems, resident in a remote host diagnostic computer and accessed via RIC, have never been used to diagnose and correct copy quality defects. Thus, there is need of a method for remotely diagnosing copy quality defects in system reprographic machines and digital copiers.

SUMMARY OF THE INVENTION

It is thus an object of the invention to provide a method of automating the copy quality defect repair process, and the ability to diagnose the problem preferably before the service representative arrives at the customer's location. A user interface at the system reprographic machine is used to establish communication with a remote diagnostic computer, automatically transmit machine identity and physical data, copy quality comparison data and to accept and display status messages, without the need for oral communication. Alternatively, a service representative may carry a portable computer with the diagnostic software resident therein. This portable computer can either be used remotely from the service representative's location (e.g., via a telephone modem connection), or locally (i.e., on site).

These and other objects and advantages are obtained by the inventive process for remotely diagnosing copy quality defects in printed electronic page images of a print job being processed by an electronic reprographic system, the reprographic system including a printer for producing prints from the page images in response to job program instructions, and a user interface with display screen and at least one command input device for inputting the job program instructions for the print job, comprising the steps of: 1) printing the print job; 2) determining if a random copy quality defect is present; 3) scanning the defective print job pages thereby creating digitized page images of the defective pages; 4) transmitting the digitized page images containing the copy quality defect along with reprographic system identification and physical data to a remote diagnostic computer; 5) analyzing the digitized page images containing the copy quality defect; 6) receiving a list of corrective procedures from the remote diagnostic computer, the list being displayed on the user interface display screen; and 7) implementing the list of corrective procedures thereby correcting the copy quality defect.

In another preferred embodiment, a process for diagnosing recurring copy quality defects in printed electronic page images is described. In this process, a recurring or repeatable copy quality defect is observed, whereupon the operator instructs the reprographic system, by job program instruction, to print a test pattern stored in a memory of the reprographic system, the printed test pattern now exhibits the previously detected copy quality defect. Next, the defective printed test pattern is scanned thereby creating a digitized image of the printed test pattern. This is transmitted to and analyzed by the remote diagnostic computer which provides a list of corrective procedures as in the first embodiment.

Thus, a process is provided whereby system operators may transmit information about the copy quality problem to a diagnostic computer that has resident therein appropriate diagnostic software for diagnosing such problems. The information transmitted to the diagnostic computer may be a scanned image of a document that exhibits the problem, or the results of initial processing that might be performed on the scanned image at the customer's location. In addition, related machine physical data (i.e., xerographic set points stored in machine nonvolatile memory) might also be transmitted. In summary, this process allows electronic reprographic systems and digital copiers that exhibit copy quality defects to be diagnosed remotely before a service representative is dispatched to a customer's location. This provides the potential to reduce service call duration, reduce the number of follow-up service calls, improve customer satisfaction and significantly decrease customer cost.

Finally, it is also preferable to have appropriate software incorporated in the reprographic system that allows the system to compare the internally stored test pattern with the scanned image having the copy quality defect, and to encode only the differences. This would minimize the amount of information that must be transmitted to the host or portable diagnostic computer, where the differences may be analyzed. Additionally, these encoded differences could also be analyzed by software incorporated into the system reprographic machine itself.

Other objects, advantages and salient features of the invention will become apparent from the detailed description which, taken in conjunction with the annexed drawings, discloses the preferred embodiments of the invention.

BRIEF DESCRIPTION OF THE DRAWINGS

Referring now to the drawings which form part of this original disclosure.

DETAILED DESCRIPTION OF THE PREFERRED EMBODIMENTS

The process for remotely diagnosing both non-repeatable and repeatable copy quality defects in printed pages of a print job being processed by an electronic reprographic system or other digital copier will be described herein. For a general understanding of the invention, reference is made to the drawings. In the drawings, like reference numerals have been used throughout to designate identical elements.

Figure 1:
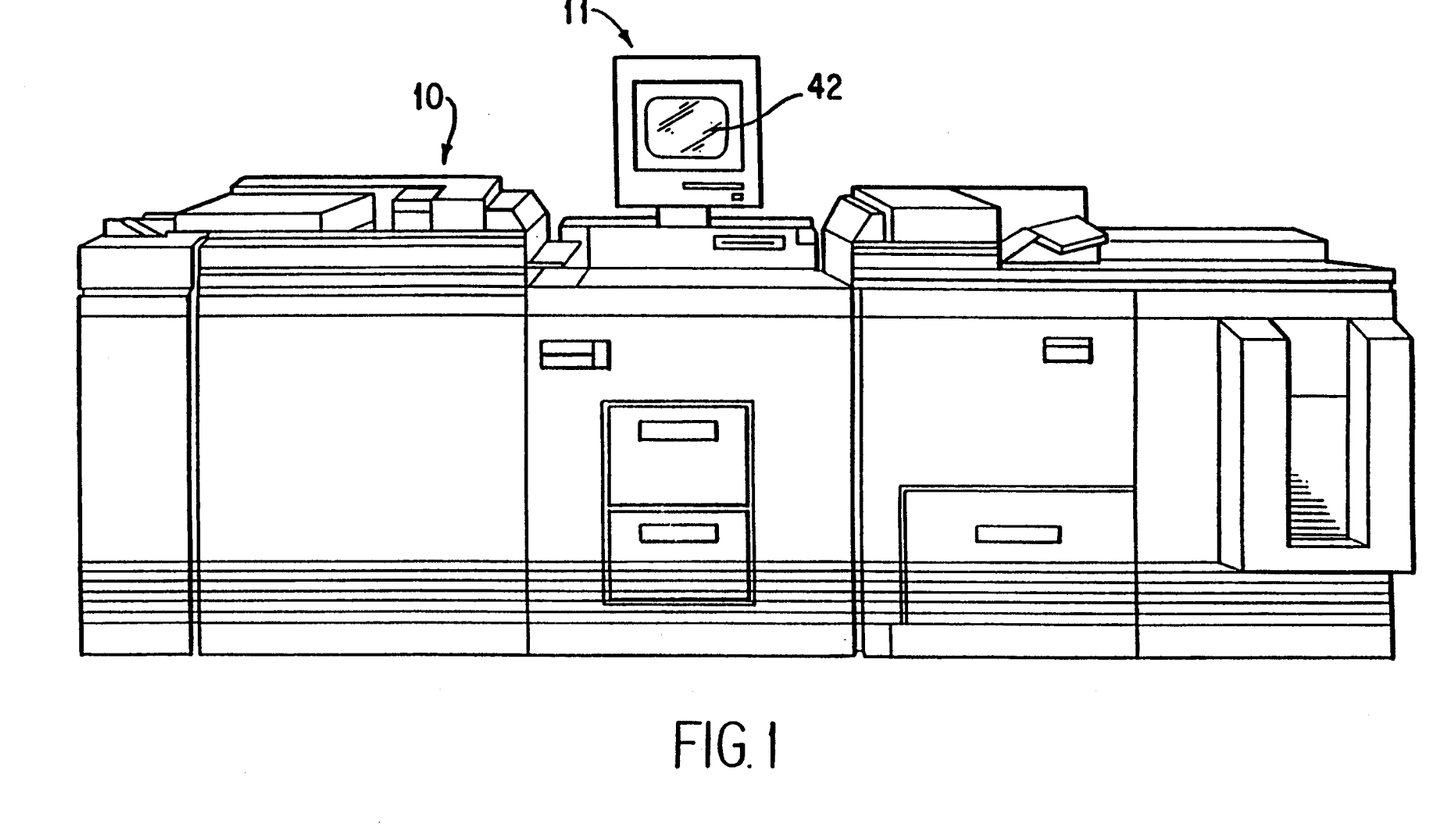
FIG. 1 shows a typical system reprographic machine having a user interface suitable for use with the invention.

FIG. 1 shows an electronic reprographic system 10 composed of a plurality of programmable components and subsystems which cooperate to carry out copying or printing jobs programmed through a touch dialog screen 42 of a user interface (UI) 11. Internal operating systems of the electronic reprographic system 10 are disclosed in U.S. Pat. No. 5,038,319 and 5,057,866, owned by the assignee of the present invention (the disclosures of which are incorporated herein by reference), and no further detailed description thereof is necessary. Reprographic system 10, however, is merely representative and it should be understood that a loosely coupled reprographic system (i.e., scanner and printer may exist separately and are connected by a network cable) is also applicable for use with the invention described herein.

Figure 2:
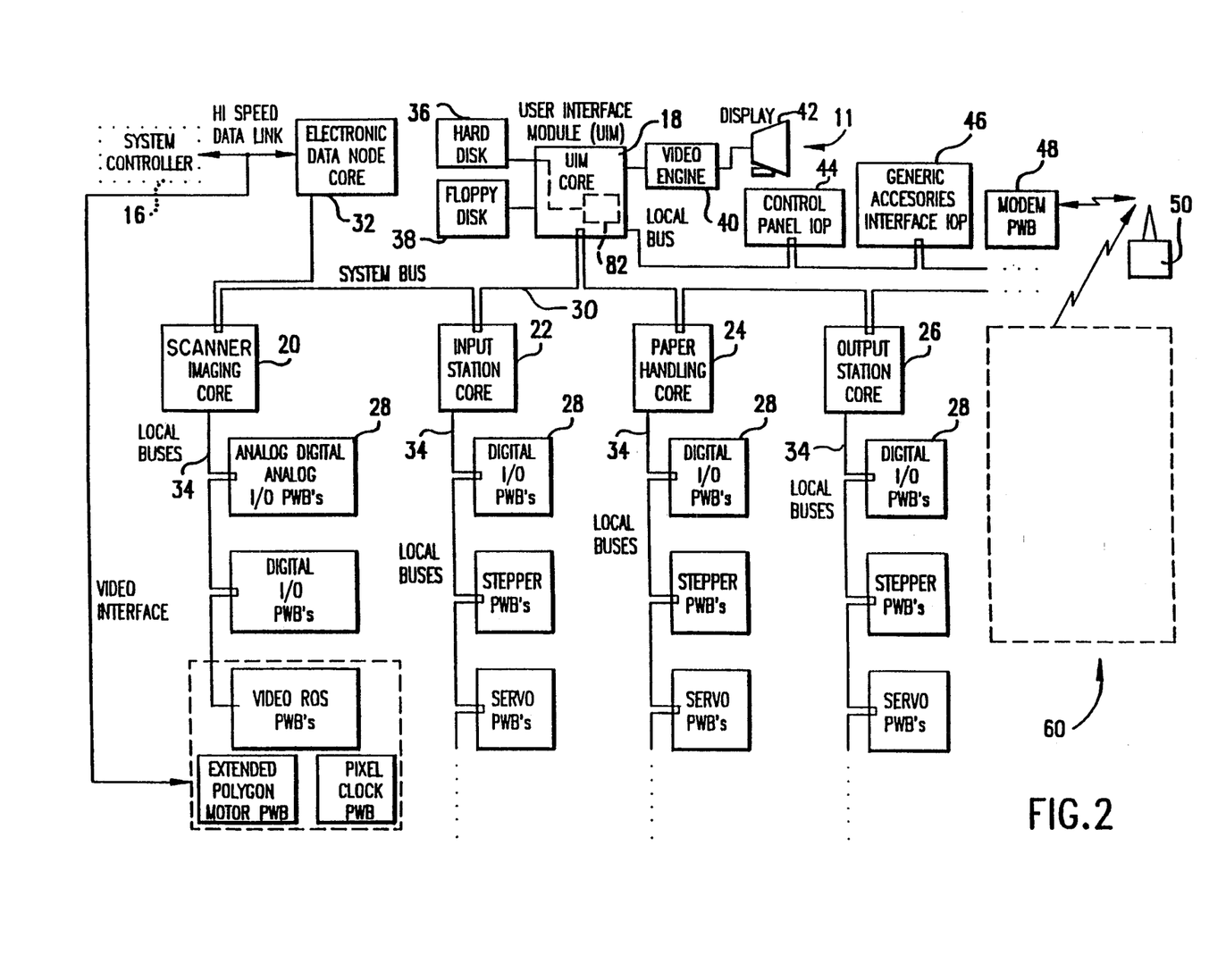
FIG. 2 is a schematic diagram of reprographic equipment having a user interface for communicating with a remote diagnostic computer.

Referring to FIG. 2, operation of the various components of reprographic system 10 is regulated by a control system which uses operating software stored in memory in the system controller 16 to operate the various machine components in an integrated fashion to produce copies and prints. The control system includes a plurality of printed wiring boards (PWBs), there being a user interface module (UIM) core PWB 18, a scanner-/imaging core PWB 20, an input station core PWB 22, a paper handling core PWB 24 and an output station core PWB 26, together with various input/output (I/O) PWBs 28. A shared line (SL) 30 couples the core PWBs 18, 20, 22, 24 and 26 with each other and with the electronic data node core 32, while local buses 34 serve to couple the PWBs to the respective cores and to stepper and servo PWBs. Programming and operating control over electronic reprographic system 10 is accomplished through touch dialog screen 42 of UI 11. The operating software includes application software for implementing and coordinating operation of system components.

Floppy disk port 38 provides program loading access to UIM core PWB 18 for the purpose of entering changes to the operating software, loading specific programs, such as diagnostic programs, and retrieving stored data, such as machine history data and fault data, using floppy disks. Hard disk 36 is used as a non-volatile memory (NVM) to store programs, machine physical data and specific machine identity information.

UIM core PWB 18 communicates with video engine 40 for driving a suitable visual display 42, such as a CRT or flat screen of the user interface 11. The UIM core 18 also has connected thereto a control panel I/O processor 44 and a generic accessories interface I/O processor 46. The interface I/O processor 46 is in turn connected to a modem PWB 48. The modem 48 provides communication between reprographic system 10 and a communications channel, such as a public switched telephone network 50 to facilitate information transfer to and from a remote diagnostic computer 60.

The information from the subsystem cores flows to and from the UIM core PWB 18, which embodies software control systems including a user interface system manager and a user interface diagnostic manager. The UI system manager includes a UI display manager subsystem for controlling the display of messages on the display 42. A data manager subsystem provides data management to the UI system manager.

Figure 5:
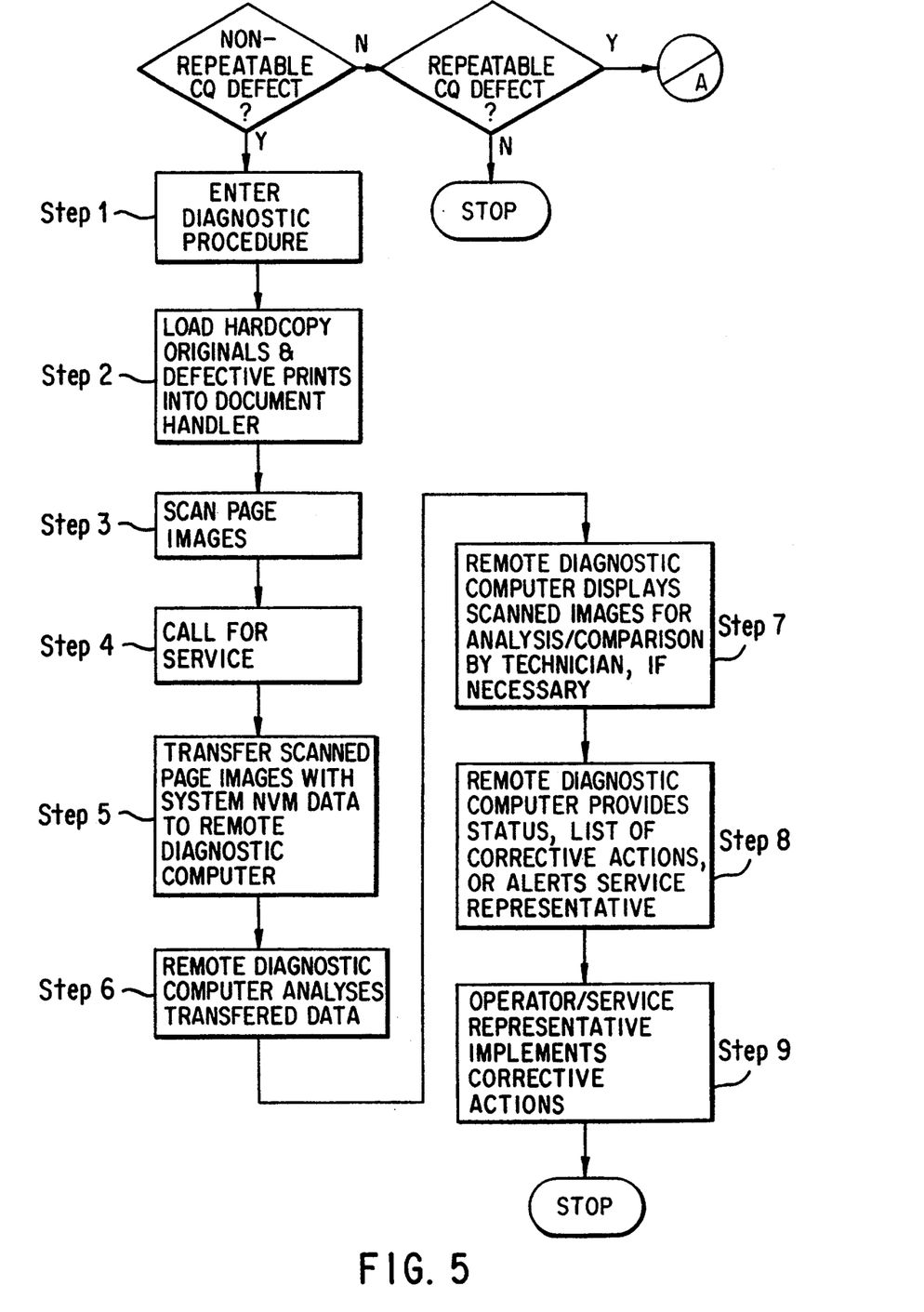
FIG. 5 is a flowchart of the inventive process for remotely diagnosing non-repeatable copy quality defects in printed pages of a print job being processed by an electronic reprographic system according to the invention.
Figure 6:
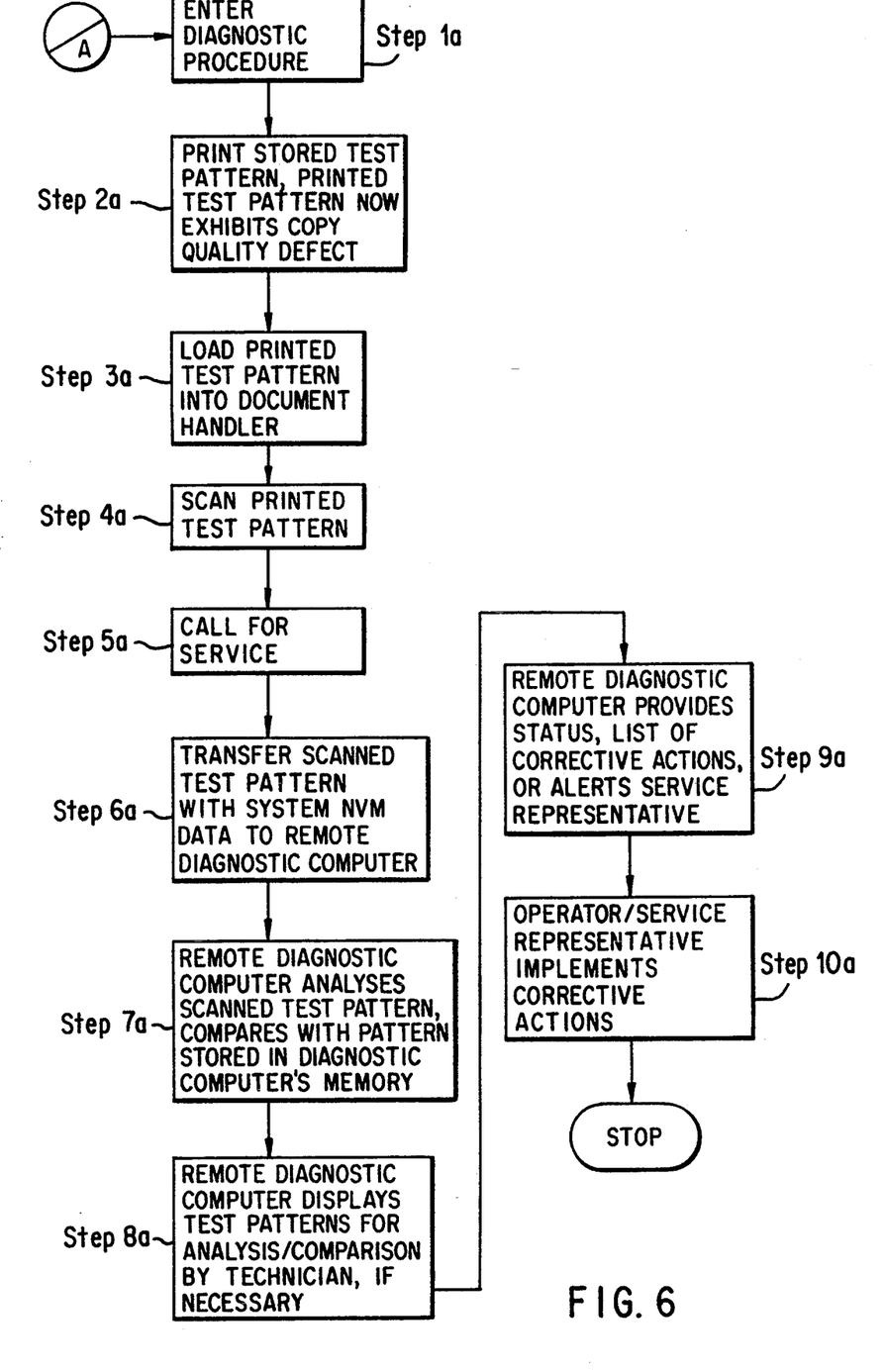
FIG. 6 is a flowchart of the inventive process for diagnosing repeatable copy quality defects in printed pages of a print job being processed by an electronic reprographic system according to the invention.

In a first embodiment of the invention (see FIG. 5), the operator prints a print job and observes a copy quality defect (if a non-repeatable defect, stay with the flow of FIG. 5; if a repeatable defect, shift to the flow of FIG. 6). Before initiating a service call, however, the operator will enter the diagnostic procedure (step 1) and load the defective print job pages into the system document handler (Step 2) for scanning. Scanning the defective print job pages (Step 3) creates digitized page images of the defective pages and thereby enables subsequent transfer of the digitized page images containing the copy quality defect to the remote diagnostic computer 60.

Now the operator wishes to enable the call for service feature (Step 4) of the invention. The call for service 104 feature is activated through the touchscreen 42 by the pull-down menu 100 shown in FIG. 3. Display management systems for pull-down menus are known and no further detailed explanation of them is necessary here. It will be understood that during initialization, other information to enable RIC, such as modem parameters, machine model identity, machine serial number and diagnostic computer telephone number have been entered in NVM 36. This information is handled as an initial data stream that is provided to remote diagnostic computer 60 when initiating a service call.

Figure 3:
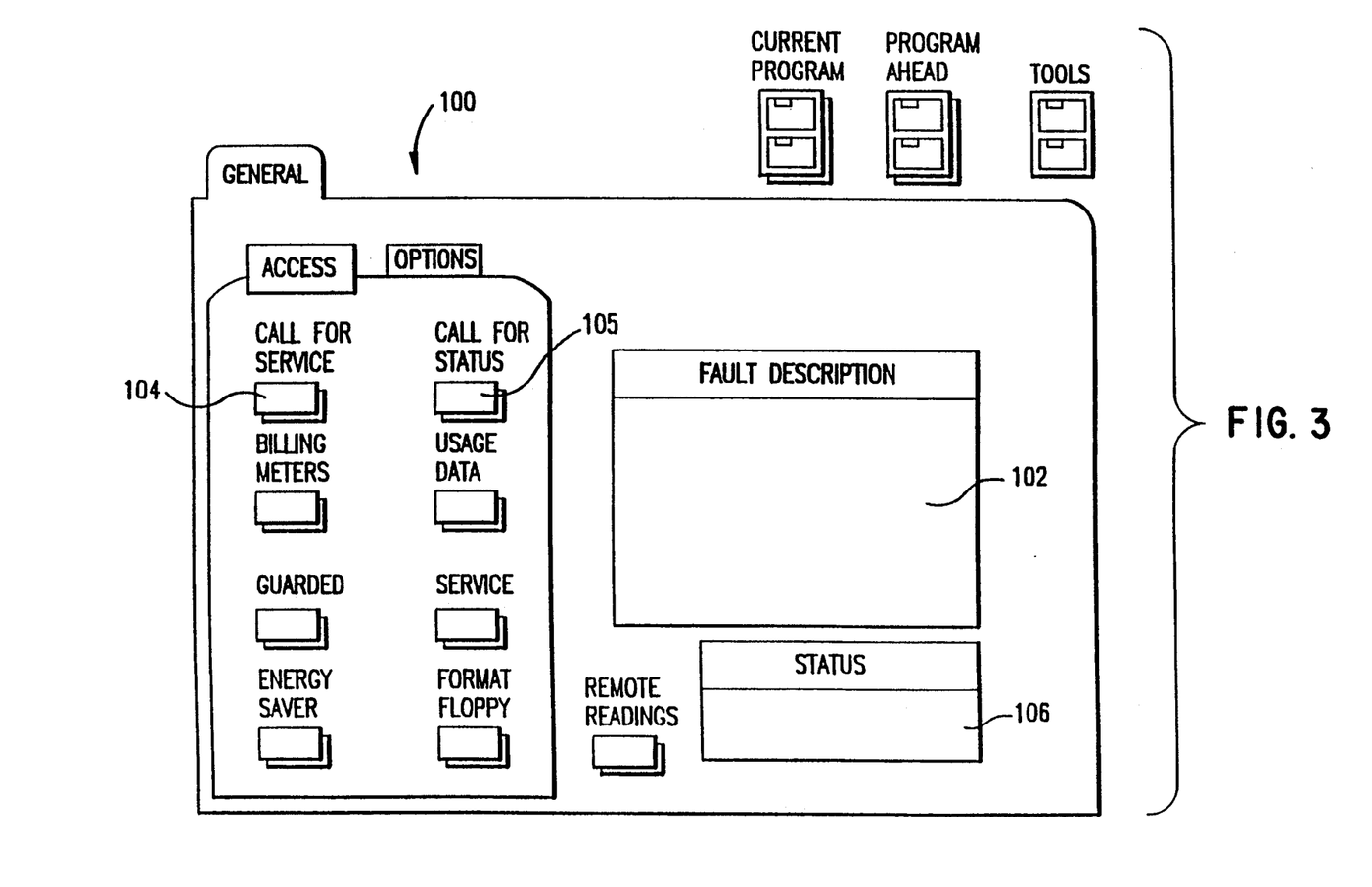
FIG. 3 illustrates a pull-down screen for enabling a copy quality defect service call.

As shown in FIG. 3, the pull-down menu 100 includes a fault description capability enabling the operator to enter copy quality defects by code number or by written description in the fault description screen 102 (using pen, keyboard, mouse or other suitable input device). Such fault description information also can be included in the initial data stream sent to remote diagnostic computer 60. To initiate a call for service, the operator may engage the touchscreen 42 by hand at the location of the call for service icon 104 or select the icon with a mouse (not shown).

When the call for service icon 104 is activated, the reprographic system 10 attempts to place a call to the diagnostic computer 60. If a carrier line is detected, the processing goes to a logon procedure of a known type for logging on to diagnostic computer 60. During the logon procedure, the initial data stream is transmitted from the NVM to the remote diagnostic computer 60 and the call is identified by at least one bit of the data stream as a call for service. If a successful connection to the remote diagnostic computer 60 is made, the digitized page images containing the copy quality defect along with reprographic system identification and physical data are transferred to the remote diagnostic computer 60 (Step 5).

Figure 4:
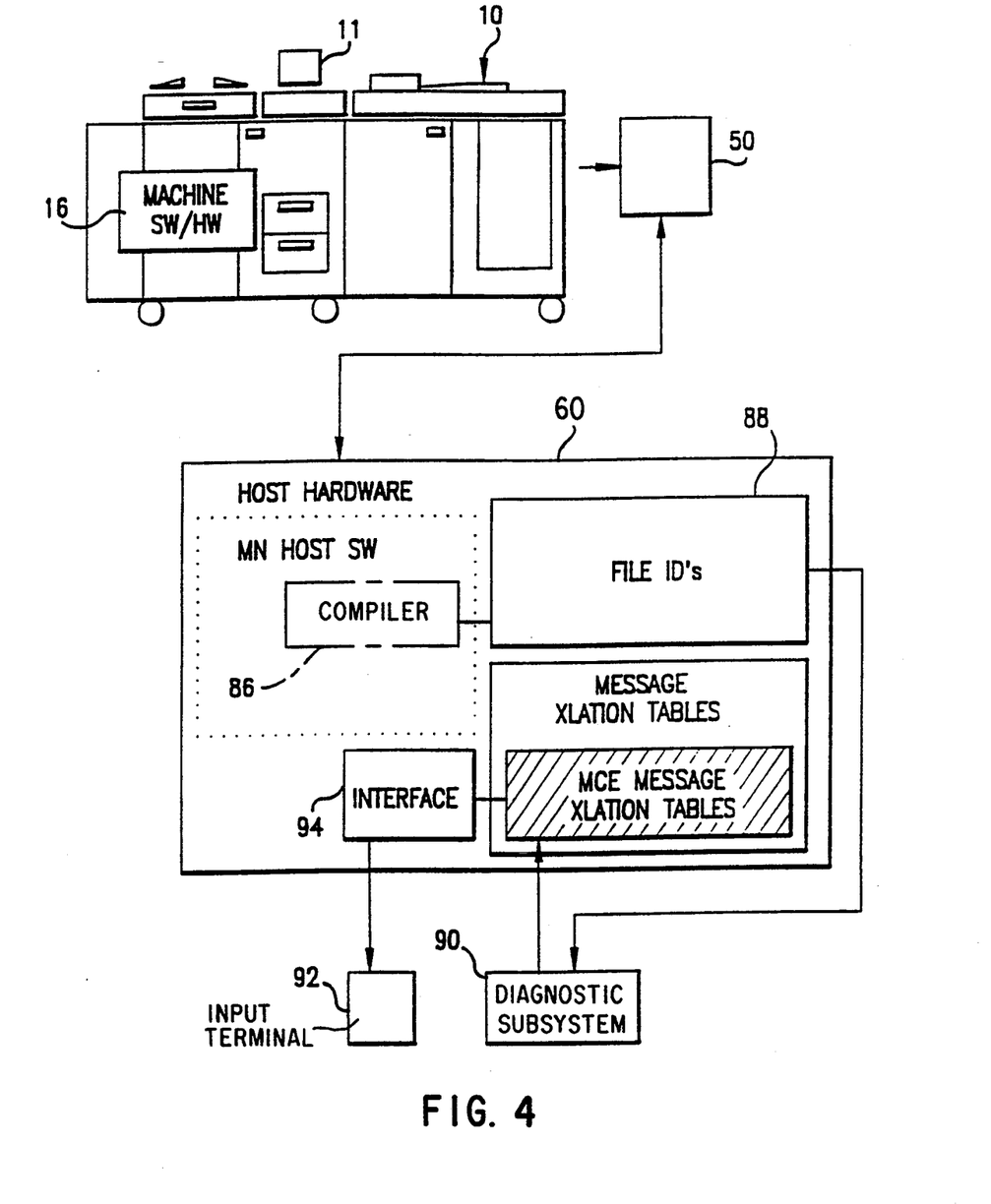
FIG. 4 is a schematic illustration of the remote diagnostic computer depicted as element 60 in FIG. 2.

Referring to FIG. 4, at a remote diagnostic site there is typically a host mainframe computer 60 having appropriate expert system software stored therein for overall control of the computer 60 and for analysis of the copy quality defect. In order to enable the computer 60 to communicate with a plurality of different machine types, a compiler 86 is utilized to convert all incoming data into common machine format. The information from the compiler 86 is provided to an addressable file 88 in which the identities of all machines served by the computer 60 may be stored. The file 88 may also store historical machine physical data, repair histories and original test patterns for each reprographic machine that is served by the remote diagnostic computer 60.

In the event the communication to computer 60 is a call for service, the information from the file 88 for the reprographic system 10 requesting service is provided to a diagnostic subsystem 90. The portion of the file for the reprographic system 10 requesting service is identified by the initial data stream received by diagnostic computer 60 during the logon procedure. The diagnostic subsystem 90 includes diagnostic routines that are of a higher level than those normally a part of any diagnostic system within the electronic reprographic system 10. On the basis of the information provided from the file 88, the subsystem 90 determines appropriate corrective measures (Step 6) and supplies direction to a message translation table for providing diagnostic information that can be communicated back to the reprographic system 10 for display, for example on user interface 11, thereby enabling the operator to apply the appropriate corrective action to overcome the copy quality defect experienced. If the diagnostic subsystem 90 determines that additional reprographic system physical data is necessary to diagnose the copy quality defect, a return flow of commands issues from diagnostic computer 60 through automatic call capabilities (not shown) to reprographic system 10. The commands may place a request for additional information on the user interface 11 or obtain the required information directly from an NVM, such as hard disk 36, within the reprographic system 10.

The host computer 60 also provides status (Step 8) information, through the communication link 50, back to the user interface 11 to advise the operator of the status of the service request. The information can be provided on the basis of schedule information and subroutines available in the control software of host computer 60 or can be manually provided through an input terminal 92, such as a keyboard and display unit, through an interface port 94. If the results of the diagnostic routines performed in the diagnostic subsystem 90 indicate that a repair call by a service representative is necessary to correct the copy quality defect, an operator at the service site can provide this information, entered through input unit 92, for display at the user interface 11. Such information can include the name of the service representative assigned and the estimated time of arrival (Step 9). The status information may be stored in the file 88 and either provided automatically to reprographic system 10 or upon request from reprographic system 10. The data stream sent by host computer 60 to reprographic system 10 can include an appropriate identifier bit for identifying the data stream as status information. The status information is directed by the processor in UIM core 18 to video engine 40, to display status information in the status field 106 of the pull-down menu shown in FIG. 3.

A communications switch 82 implemented in UIM core 18 software (see FIG. 2) includes a call for status request (Step 8), which is preferably implemented through menu 100 displayed on UI 11. The call is initiated by the operator on menu 100 by actuation of the call for status icon 105, through touchscreen 42 or by use of a mouse. Basically the same procedure described above with respect to the call for service is followed with respect to the call for status. The initial stream includes a unique identifier for indicating that the call is for status. The status call is identified as such and communicated to diagnostic computer 60, including the necessary information from hard disk 36 for identifying the requesting machine. When a call for status is received, the diagnostic computer 60 directs the status information back to reprographic system 10, through communication system 50, for display on a UI screen 11. When service has been completed, an appropriate message can be supplied to the file 88, either from the UI of reprographic system 10 or from terminal 92 to remove the service call status information from the file 88.

Alternatively, at the reprographic system 10, it may be necessary for the operator to transmit scanned images of both the document exhibiting the copy quality defect and a copy of the original to the remote diagnostic computer 60. The diagnostic software can then compare the two images, and determine that the difference between the two is the copy quality defect. If necessary, the images of the defective page containing the copy quality defect and the original may be displayed at the remote site for review and analysis by a service representative (Step 7).

Further, see FIG. 6, in situations where a copy quality defect is repeatable (i.e., a non-random event), the operator again enters the diagnostic procedure (step 1a) and the reprographic system 10 can be instructed by job program instruction using the touchscreen 42, to print a known test pattern (Step 2a) stored in NVM 36 of the reprographic system 10. The printed test pattern, which now exhibits the copy quality defect, would then be scanned (Steps 3a and 4a) and transmitted (Step 5a) to the remote diagnostic computer 60 in the manner described above. The remote diagnostic computer 60 would then compare the scanned image with its own electronic copy of the test pattern for that particular reprographic system 10, stored in the addressable file 88, and identify the defect (Steps 6a through 9a).

Additionally, an alternative to using a remote diagnostic computer 60 would be for a service representative to carry a portable computer (not shown) which had stored therein appropriate diagnostic software as described above. This portable computer might be used either remotely from the service location (for example, via a telephone modem connection) or locally at the customer's location. If used remotely, the RIC remote repair application might be used by the service representative to transmit the corrective procedures directly into the NVM 36 of the reprographic system 10 exhibiting the copy defect problem (as discussed above), so that a service call may not be required depending on severity of problem.

It should also be understood that the remote diagnostic computer 60 could also be programmed to automatically correct the diagnostic defect without requiring service technician involvement. The remote diagnostic computer 60 would merely transfer the corrective procedures via the RIS into the NVM 36 of the effected reprographic system 10. Additionally, an appropriate message would be displayed on UI 11.

It should further be understood, that in addition to using a host diagnostic computer or portable diagnostic computer for scanned image analysis, it is understood that the reprographic system 10 may have appropriate internal software for comparing the internally stored test pattern with the defective scanned image and to encode only the differences for transmission to the remote diagnostic computer 60. In this way, the amount of information that must be transmitted is minimized and the host or portable diagnostic computer may then analyze only the differences.

Finally, it may also be understood that appropriate diagnostic software may be stored in the reprographic system 10 itself thereby curtailing or, in some instances, eliminating the need for transferring data to a remote diagnostic computer. This, however, is not the most cost effective or preferred method of the invention.

The foregoing inventive concept provides for quick and accurate initiation of a copy quality defect service call automatically, without the need for oral communication. Diagnosis can occur remotely before a service representative is dispatched to the customer's location. Further, status information is available and automatically provided to the faulted reprographic system without the need for oral communication with personnel at the remote diagnostic computer site. This provides the potential to reduce service call duration, reduce the number of followup service calls, and improve customer satisfaction.

While the invention has been described in connection with the preferred embodiments, it will be understood that it is not intended to limit the invention to these embodiments. On the contrary, it is intended to cover all alternatives, modifications and equivalents as may be included within the spirit and scope of the invention as defined by the appended claims.

What is claimed is:

1. A process for remotely diagnosing non-repeatable copy quality defects in printed pages of a print job being processed by an electronic reprographic system, the reprographic system includes a printer for producing prints from the pages in response to job program instructions, and a user interface with display screen and at least one command input device for inputting the job program instructions for the print job, comprising the steps of:

printing the print job;

determining a non-repeatable copy quality defect is present;

loading the defective print job pages into a system document handler for scanning;

scanning the defective print job pages thereby creating digitized page images of the defective pages;

transferring the digitized page images containing the copy quality defect along with reprographic system identification and physical data to a remote diagnostic computer, the remote diagnostic computer having expert system software stored in a memory thereof for analyzing the copy quality defect;

analyzing the digitized page images using the remote diagnostic computer;

receiving from the remote diagnostic computer at least one of a status message, notice that a service technician is responding and a list of corrective procedures, the at least one status message, notice and list being displayed on the user interface display screen; and implementing the list of corrective procedures thereby correcting the copy quality defect.

2. The process according to claim 1, wherein the transferring step further comprises:

transferring said data to the remote diagnostic computer by using at least one of a network data-link, a telephone modem data-link and a floppy disk.

3. The process according to claim 2, wherein the remote diagnostic computer is a host main frame computer, and the process further comprises locating the host main frame computer at a service facility.

4. The process according to claim 2, further comprising providing the remote diagnostic computer as a portable computer.

5. The process according to claim 1, wherein the implementing step is performed automatically by the diagnostic computer which inputs corrective procedures directly into a non-volatile memory of the reprographic system.

6. The process according to claim 1, wherein the transferring and analyzing steps further comprise:

transferring scanned images of both the defective pages and originals of the defective pages; and analyzing both scanned images to determine differences between the scanned images thereby identifying the copy quality defect using said remote diagnostic computer.

7. The process according to claim 6, wherein said analyzing step further comprises:

displaying remotely the transmitted page image data for analysis by a technician.

8. The process according to claim 1, wherein the transferring and analyzing steps further comprise:

transferring only the differences between scanned images of both defective pages and originals of the defective pages; and analyzing the differences to identify the copy quality defect using said remote diagnostic computer.

9. A process for remotely diagnosing repeatable copy quality defects in printed pages of a print job being processed by an electronic reprographic system, the reprographic system including a printer for producing prints from the pages in response to job program instructions, and a user interface with display screen and at least one command input device for inputting the job program instructions for the print job, comprising the steps of:

printing the print job;

determining a repeatable copy quality defect is present;

instructing the reprographic system, by job program instruction, to print a test pattern stored in a memory of the reprographic system, the printed test pattern now exhibits the copy quality defect;

loading the printed test pattern into a system document handler for scanning;

scanning the defective printed test pattern thereby creating a digitized image of the printed test pattern;

transferring the digitized image of the printed test pattern along with reprographic system identification and physical data to a remote diagnostic computer, the remote diagnostic computer having expert system software stored in a first memory thereof for analyzing the copy quality defect;

analyzing the digitized image of the printed test pattern containing the copy quality defect using the remote diagnostic computer;

receiving from the remote diagnostic computer at least one of a status message, notice that a service technician is responding and a list of corrective procedures, the at least one status message, notice and list being displayed on the user interface display screen; and implementing the list of corrective procedures thereby correcting the copy quality defect.

10. The process according to claim 9, wherein the transferring step further comprises:

transferring the data to the remote diagnostic computer by using at least one of a network data-link, a telephone modem data-link and a floppy disk.

11. The process according to claim 10, wherein the remote diagnostic computer is a host main frame computer, and the process further comprises locating the host main frame computer at a service facility.

12. The process according to claim 10, further comprising providing the remote diagnostic computer as a portable computer.

13. The process according to claim 9, wherein the implementing step is performed automatically by the diagnostic computer which inputs corrective procedures directly into a non-volatile memory of the reprographic system.

14. The process according to claim 9, wherein the analyzing step further comprises:

comparing the transmitted digitized image of the printed test pattern with an original of the digitized test pattern stored in a second memory of the diagnostic computer and accessed using the system identification and physical data previously transferred;

15. The process according to claim 14, wherein the analyzing step further comprises:

displaying remotely the transmitted digitized image of the printed test pattern for analysis by a technician.

16. The process according to claim 9, wherein the transferring and analyzing steps further comprise:

transferring only the differences between scanned images of both defective pages and originals of the defective pages; and analyzing the differences to identify the copy quality defect using said remote diagnostic computer.

* * * * *